United States Patent
Newstadt

(10) Patent No.: US 8,949,979 B1
(45) Date of Patent: Feb. 3, 2015

(54) PROTECTING LOCAL USERS FROM REMOTE APPLICATIONS

(75) Inventor: Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 784 days.

(21) Appl. No.: 12/896,719

(22) Filed: Oct. 1, 2010

(51) Int. Cl.
*H04L 29/06* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 2006/0253458 A1* | 11/2006 | Dixon et al. | 707/10 |
| 2007/0094260 A1* | 4/2007 | Murphy et al. | 707/9 |

* cited by examiner

*Primary Examiner* — William Goodchild
(74) *Attorney, Agent, or Firm* — Brill Law Office; Jeffrey Brill

(57) ABSTRACT

It is detected whenever the user of the local computer system views online content that provides an entryway to a remote application. When such a detection occurs, data concerning the remote application is collected and transmitted to a central repository. The central repository receives and aggregates such collected data from a plurality of sources. It is detected when the user of the local computer system is being prompted to activate a new remote application, and aggregated data concerning the new remote application is retrieved from the central repository. The aggregated data concerning the new remote application is analyzed, and responsive to the analyzing it is determined whether the new remote application is benign. Responsive to determining that the new remote application is not benign, the new remote application can be blocked, and/or a warning can be output to the user.

20 Claims, 4 Drawing Sheets

US 8,949,979 B1

PROTECTING LOCAL USERS FROM REMOTE APPLICATIONS

TECHNICAL FIELD

This disclosure pertains generally to computer security, and more specifically to protecting local users from security threats posed by applications running remotely.

BACKGROUND

The traditional model in which a user installs an application on his/her computer and runs it locally is being increasing replaced by "cloud based computing." In the cloud based model, applications are run from an external computer connected to a user's computer through the internet. Although many applications are still run locally, the cloud based model is quickly becoming more common. One context in which running remote applications is standard practice is social networking. For example, under Facebook and other social networking sites users frequently run remote applications within their online accounts. These applications do not run on the user's computer, but instead on remote computers "in the cloud." However, although these applications run from remote computers rather than locally, they can still compromise the user's security and privacy, or perform actions that are undesirable to the user.

Conventional computer security systems target malicious applications that attempt to run on a particular computer. At the user level, these security systems can be very effective at detecting and blocking attempts by malicious applications to run on a user's local computer, but provide no protection to the user's local computer against cloud based applications such as those found on social networking sites. More specifically, these conventional security systems are not equipped to detect cloud based applications or to block cloud based applications from adversely affecting the user or the user's computer. Additionally, they lack the ability to categorize cloud based applications as being malicious or benign, or to rate them by reputation. It would be desirable to address these issues.

SUMMARY

A local user is protected from security threats posed by remote applications. It is detected whenever the user of the local computer system views online content that provides an entryway to a remote application. In some embodiments, the user's network traffic is monitored as part of this detection process. When such a detection occurs, data concerning the remote application, as well as the user's interaction with the online content and/or the remote application itself is collected. The collected data is transmitted to a central repository, which receives such collected data from a plurality of client computers (and in some instances third parties as well). The central repository aggregates the collected data it receives from the plurality of sources.

It is detected when the user of the local computer system is being prompted to activate a new remote application. In some embodiments, the above-described monitoring of the user's network traffic is utilized in this detection process. In some embodiments, a database of descriptions of online content providing entryways to remote applications is maintained, and these stored descriptions of online content are utilized in the above-described detecting and collecting steps. In any case, when it is detected that the user is being prompted to activate a new remote application, aggregated data concerning the new remote application is retrieved from the central repository. The aggregated data concerning the new remote application is analyzed, and responsive to the analyzing it is determined whether the new remote application is benign. In some embodiments, this analysis comprises adjusting a reputational score of the new remote application responsive to individual pieces of aggregated data concerning the new remote application. In such embodiments, only responsive to the reputational score of the new remote application reaching a given threshold is it determined that the new remote application is not benign. In any case, responsive to determining that the new remote application is not benign, the new remote application can be blocked, and/or a warning concerning the new remote application can be output to the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
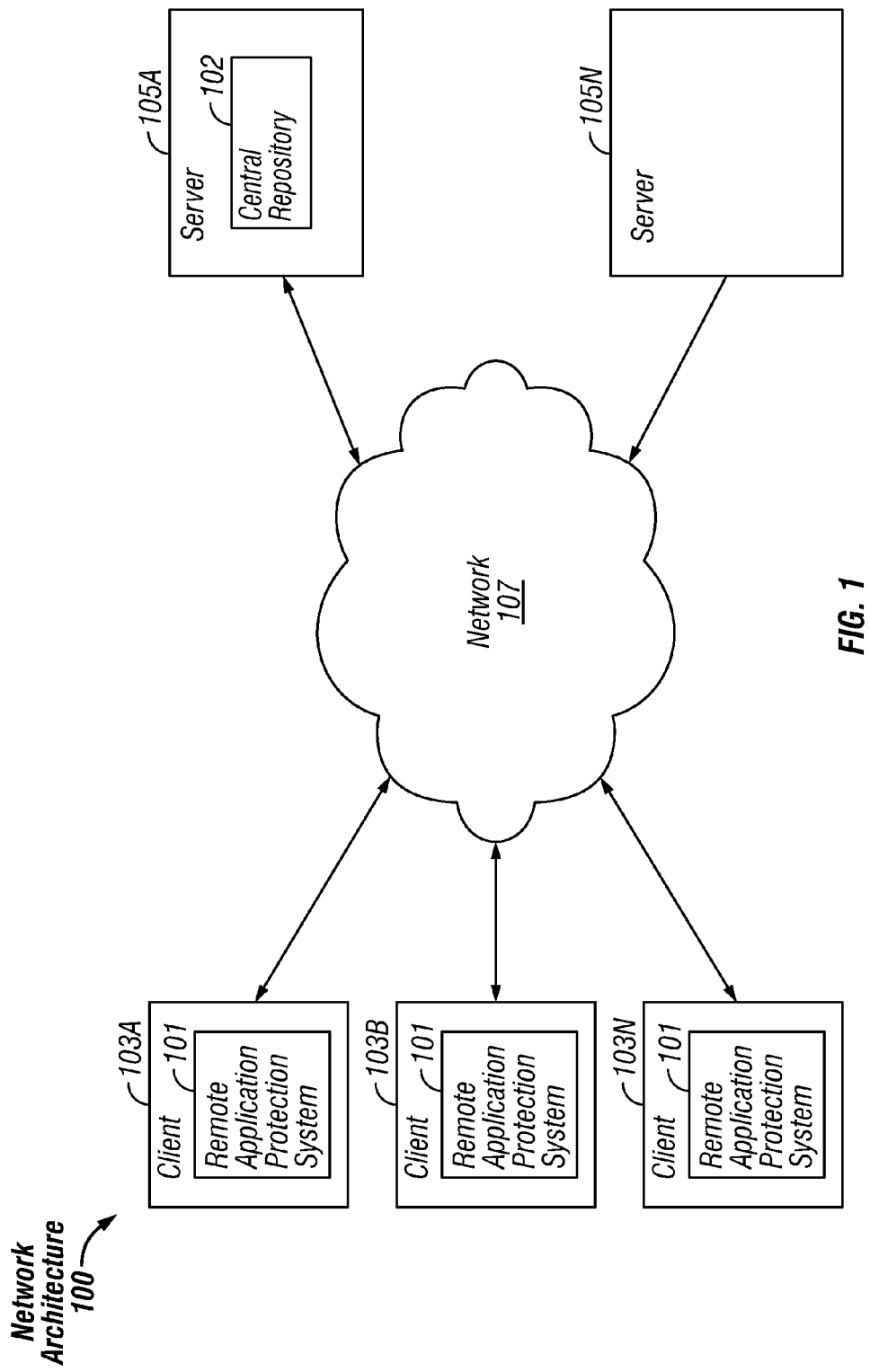
FIG. 1 is a block diagram of an exemplary network architecture in which a remote application protection system can be implemented, according to some embodiments.

FIG. 1 is a block diagram illustrating an exemplary network architecture 100 in which a remote application protection system 101 can be implemented. The illustrated network architecture 100 comprises multiple clients 103A, 103B and 103N, as well as multiple servers 105A and 105N. In FIG. 1, a remote application protection system 101 is illustrated as residing on each client 103, with a central repository 102 on server 105A. It is to be understood that this is an example only, and in various embodiments various functionalities of this system 101 can be instantiated on a client 103, a server 105 or can be distributed between multiple computing devices as desired.

It is to be understood that the clients 103 described herein comprises portable computer systems 210 capable of making and receiving phone calls, as well connecting to a network 107 and running applications (such clients 103 are sometimes referred to as smart-phones, but even many clients 103 not so designated have these capabilities). Clients 103 and servers 105 can be implemented using computer systems 210 such as the one illustrated in FIG. 2 and described below. The clients 103 and servers 105 are communicatively coupled to a network 107, for example via a network interface 248 as described below in conjunction with FIG. 2. Clients 103 are able to access applicants and/or data on servers 105 using, for example, a web browser or other client software (not shown).

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
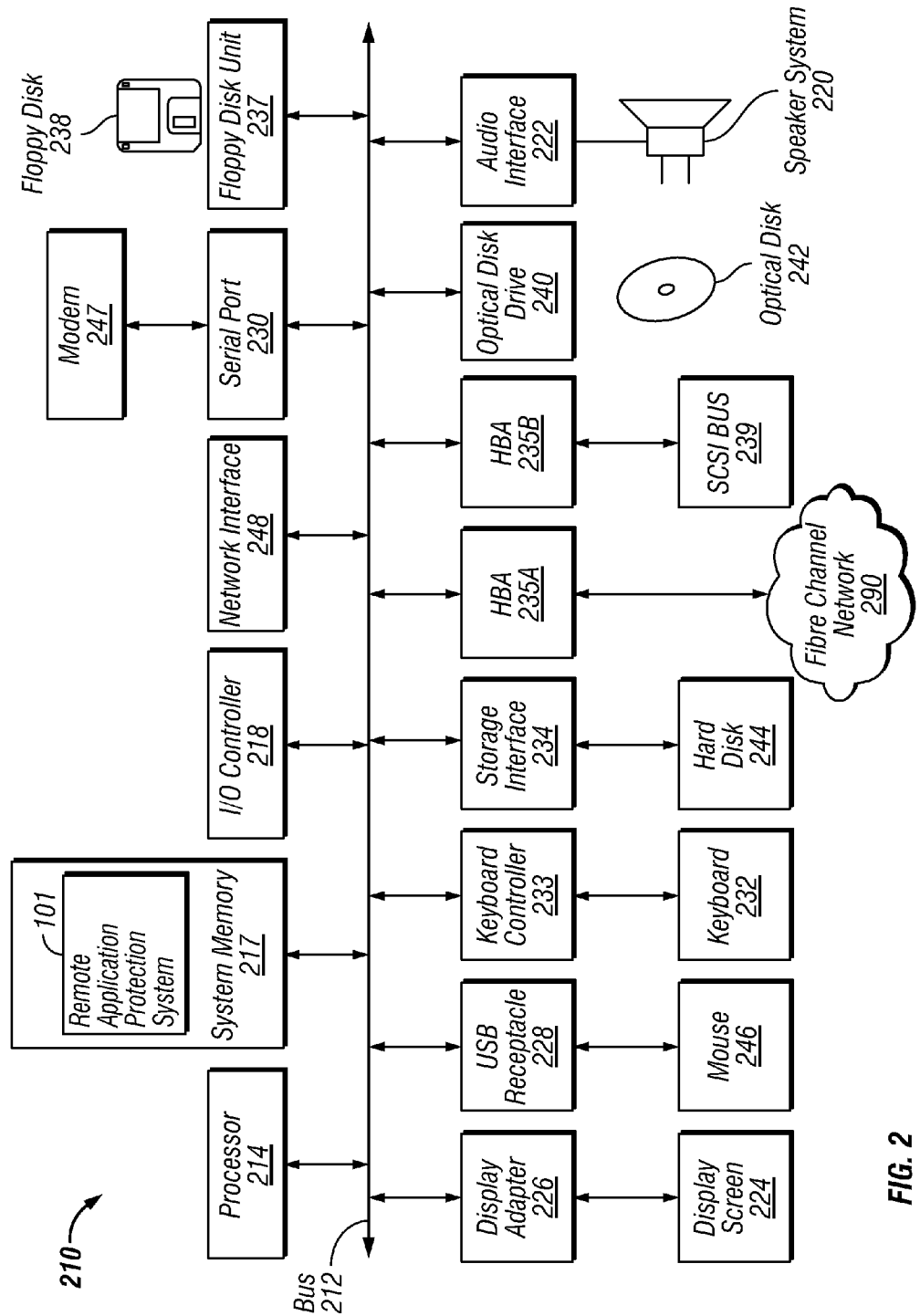
FIG. 2 is a block diagram of a computer system suitable for implementing a remote application protection system, according to some embodiments.

FIG. 2 is a block diagram of a computer system 210 suitable for implementing a remote application protection system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 228, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present, and especially in the case of a client 103, fewer features will often be present. The components can also be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the remote application protection system 101 is illustrated as residing in system memory 217. The workings of the remote application protection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
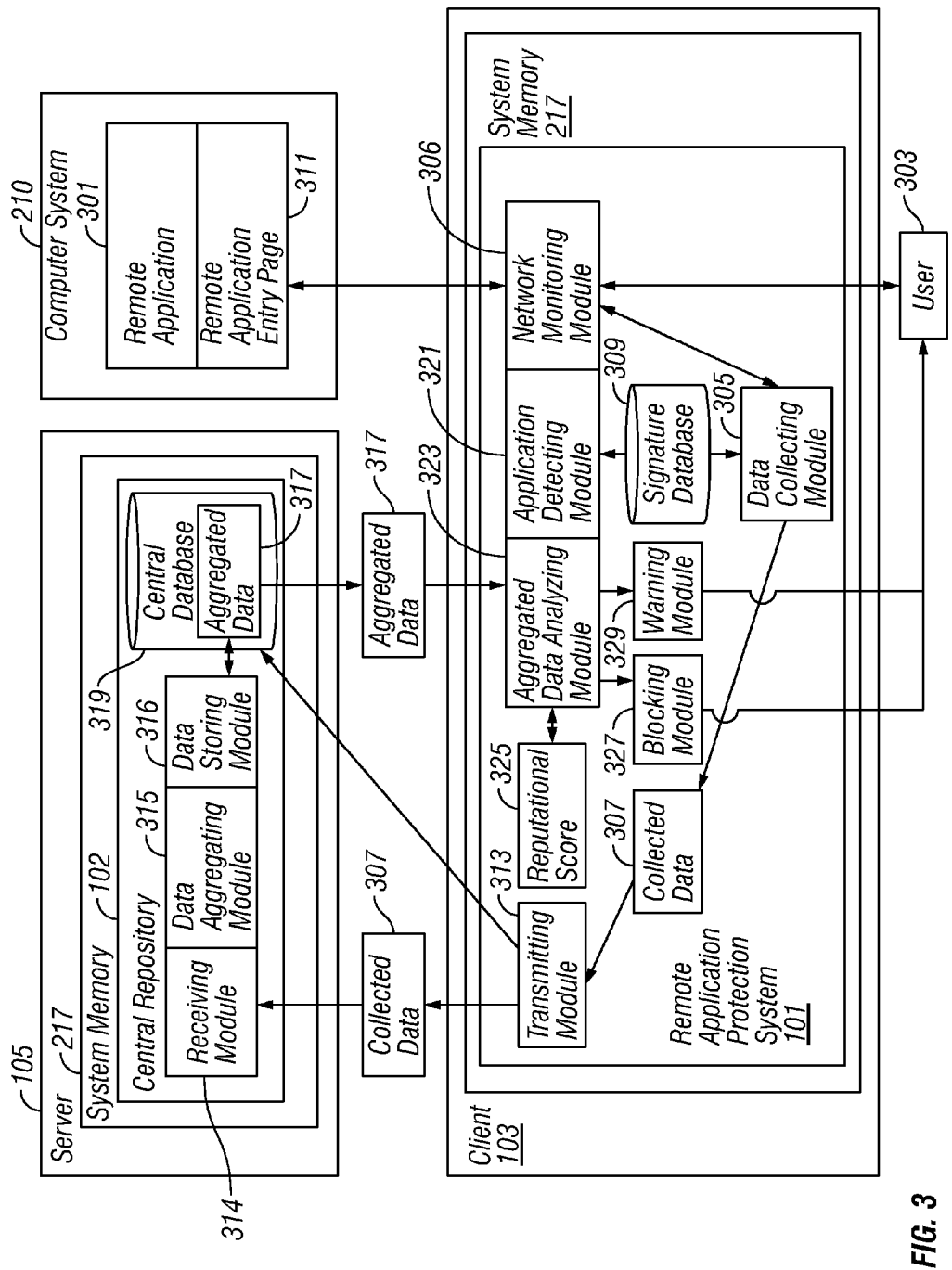
FIG. 3 is a block diagram of the operation of a remote application protection system, according to some embodiments.

FIG. 3 illustrates the operation of the remote application protection system 101, residing in the system memory 217 of a client 103 with a central repository 102 residing on a server 105. As described above, the functionalities of the remote application protection system 101 including those of the central repository 102 can reside on a client 103, a server 105, or be distributed between multiple computer systems 210, including within a cloud-based computing environment in which the functionality of the remote application protection system 101 is provided as a service over a network 107. It is to be understood that although the remote application protection system 101 is illustrated in FIG. 3 as a single entity, the illustrated remote application protection system 101 represents a collection of functionalities, which can be instantiated as a single or multiple modules as desired (an instantiation of specific, multiple modules of the remote application protection system 101 is illustrated in FIG. 3). It is to be understood that the modules of the remote application protection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the remote application protection system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the remote application protection system 101 runs on a client 103, and determines whether various remote applications 301 (e.g., social networking or other online/cloud based applications 301) with which the user 303 comes in contact are malicious, introduce privacy risks, or are otherwise generally undesirable. The remote application protection system 101 can then warn the user 303 concerning these applications 301 and/or block these applications 301 based on this determination.

More specifically, a data collecting module 305 of the remote application protection system 101 collects data 307 concerning remote applications 301 with which the user 303 comes in contact. As used herein, the term "remote application" 301 means an application that can be run remotely from a user's local computer 210 (i.e., not on the user's computer 210 but on some other computer 210), but the remote running of which can be locally initiated by the user 303. To collect data 307 concerning remote applications 301, a network monitoring module 306 of the remote application protection system 101 monitors the user's web browser traffic. To this end, the network monitoring module 306 can be implemented in the form of a browser plug-in. In other embodiments, the network monitoring module 306 is instantiated in other ways, such as in the form of a network filter. As described in more detail below, a remote application detecting module 321 of the remote application protection system 101 detects when the user 303 views a webpage 311 (or other online content) that provides an entryway to a remote application 301, and the data collecting module 305 collects data 307 about the remote application 301, as well as about how the user 303 interacts with it.

In some embodiments, a website signature database 309 (or other suitable storage mechanism) stores entries describing known pages 311 (or other forms of online content) that present remote applications 301 to users 303 (e.g., specific known pages on supported social networking websites that allow users 303 to run, signup for or add specific remote applications 301). A page (or other form of online content) that presents an entryway into a remote application 301 is herein referred to as a "remote application entry page" 311. The database entries for given remote application entry pages 311 can comprise information such as the layout of the pages 311, where on a given page 311 specific relevant information can be found (e.g., the relevant privacy policy, the relevant usage terms, prompts to collect information from the user, etc.). In these embodiments, to direct the process of collecting data 307 concerning a specific remote application 301, the data collecting module 305 reads a corresponding entry in the website signature database 309. The website signature database 309 can reside locally on the client 103 as illustrated, or remotely on, e.g., a central server 105. Where the website signature database 309 resides locally, it is typically initially downloaded from a central location at install time, and automatically updated from the central location as new or updated information becomes available.

In embodiments in which a website signature database 309 is used, the remote application detecting module 321 combines the monitoring of the user's web traffic plus the information in the website signature database 309 to detect when the user 301 is viewing a remote application entry page 311. The data collecting module 305 then collects data 307 concerning the remote application 301 associated with the remote application entry page 311, such as its name, publisher, privacy policy, usage terms, etc. The data collecting module 305 can collect this information by reading the remote application entry page 311. The appropriate entry in the website signature database 309 can guide the data collecting module 305 as to where on the remote application entry page 311 such data 307 can be found.

When the user 301 is interacting with a remote application entry page 311, the data collecting module 305 also monitors the user's behavior. By referring to both the information concerning the layout of the remote application entry page 311 from the website signature database 309 and the user's monitored network traffic, the data collecting module 305 is able to determine which user interface components on the remote application entry page 311 the user 303 is activating (e.g., pressing an accept button, pressing a reject button, pressing a run button, closing the active window, etc.). By monitoring the user's network traffic in light of this information, the data collecting module 305 determines information such as whether the user 303 accepts or rejects the presented remote application 301. If the user 303 rejects the presented remote application 301, the data collecting module 305 can further determine at what point in the process the user rejected the application 301 (e.g., while reviewing a description of the application 101, thereby indicating the user 303 finds it uninteresting, or while reviewing its privacy policy, thereby indicating the user 303 may consider it intrusive). In a similar manner, the data collecting module 305 can collect data 307 concerning the use of remote applications 301 such as when the user 303 removes a remote application 301 for which the user 303 previously signed up, an amount of time between initial registration and removal, when and under what circumstances the user 303 activates various remote applications 301, the system privacy settings required for specific remote applications 301 to run, potentially undesirable activity generated by specific remote applications 301 (e.g., a large number of wall posts per day, dissemination of the user's personal information, etc).

In some embodiments, there is no website signature database 309, or no entry in the website signature database 309 for a given remote application entry page 311. In such embodiments, the data collecting module 305 can identify remote application entry pages 311 in other ways, such as identifying certain objects in the HTML defining the page 311 (e.g., a data entry field labeled "user name," a link labeled "terms of use," etc.). Once a remote application entry pages 311 is identified, the data collecting module 305 can collect data 307 concerning the user's interaction therewith by monitoring the user's web traffic and detecting interaction with the page 311, as described above. In other embodiments, the data collecting module 305 monitors the user's interaction with remote applications 301 remotely (e.g., from a server computer 105, not illustrated). In other embodiments, the data collecting module 305 monitors the user's interaction with user selected remote applications 301 passively in the background, without monitoring the user's browser traffic.

A transmitting module 313 of the remote application protection system 101 transmits the collected data 307 concerning remote applications 301 to a central repository 102 (illustrated in FIG. 3 as residing on a server computer 105). A receiving module 314 of the central repository 102 receives the transmitted data 307. It is to be understood that many clients 103 run remote application protection systems 101 which collect data 307 concerning remote applications 301 and transmit that data 307 to the central repository 102. Thus, the receiving module 314 of central repository 102 receives data 307 concerning remote applications 301 from a wide variety of clients computers 103 deployed in the field.

A data aggregating module 315 of the central repository 102 aggregates received data 307 concerning remote applications 301, and a data storing module 316 stores the aggregated data 317 in a central database 319 (or other suitable information storage mechanism). Thus, the central database 319 stores aggregated data 317 concerning specific remote applications 301 collected from across the entire community of clients 103 running remote application protection systems 101. This aggregated data 317 is made available to remote application protection systems 101 running locally on client computers 103, as described in greater detail below. In some embodiments, the receiving module 314 also receives data 307 concerning remote applications 301 from one or more third parties (not illustrated). Such parties could be, for example, security providers or parties that track application reputation or commercially provide blacklists and/or whitelists. Any received third part data 307 concerning remote applications 301 can be aggregated and stored as described above.

On the client side, the remote application detecting module 321 uses the network monitoring module 306 and the signature database 309 as described above to determine when the user 303 is being prompted to activate a new remote application 301 (e.g., run, sign up for, add or accept the remote application 301). The transmitting module 313 then makes a request to the central database 319 to retrieve aggregated data 317 concerning the remote application 301 the user 303 is being prompted to activate. An aggregated data analyzing module 323 of the remote application protection system 101 analyzes the received aggregated data 317 to determine whether the remote application 301 is malicious or benign. Depending on the results of the analysis, the user 303 can be allowed to proceed with the activation of the remote application without interruption, the user 303 can be warned concerning possible risks associated with the remote application 301, or the user's attempt to activate the new remote application 301 can be blocked outright.

Reasons for blocking and/or warning include, for example, a large number of users 303 having previously rejected the remote application 301, a large number of users having removed the remote application 301, the remote application 301 has been detected generating suspect activity (e.g., frequent wall postings), the remote application 301 has been detected exposing private user data (e.g., in wall postings), the remote application 301 has an insufficient privacy policy, the remote application 301 has been blacklisted by a trusted third party source, etc. It is to be understood that these are simply the types of evidence that can be gleaned from the aggregated data 317 concerning a specific remote application 301 that can result in the remote application 301 being blocked and/or the user 303 being warned. It is to be understood that under what circumstances to block a remote application 301 and/or warn the user 303 concerning the application 301 is a variable design parameter. In some embodiments, individual pieces of aggregated data 317 indicating that the remote application 301 is malicious or benign are weighed and used to adjust a reputational score 325. Only when the reputational score 325 meets a predefined threshold is the activation of the remote application 301 blocked and/or the user 303 warned. It is to be understood that the weighting values and threshold(s) to use in such embodiments are variable design parameters.

Where the aggregated data analyzing module 323 determines that the remote application 301 is to be blocked, a blocking module 327 of the remote application protection system 101 can modify the content of the remote application entry page 311 so as to block the activation of the remote application 301 (for example, by removing the accept button). The blocking module 327 can also work in conjunction with the network monitoring module 306 to block the remote application entry page 311 altogether, or to block the transmission of the user's request to active the remote application 301.

Where the aggregated data analyzing module 323 determines that the user 303 is to be warned concerning the remote application 301, a warning module 329 of the remote application protection system 101 can modify the content of the remote application entry page 311 so as to output any relevant warning information concerning the remote application 301, including an explanation in cases where the remote application 301 is being blocked. The warning module 329 can also output warning information to the user via user interface components outside of the remote application entry page 311, such as a toaster or popup dialog box.

Figure 4:
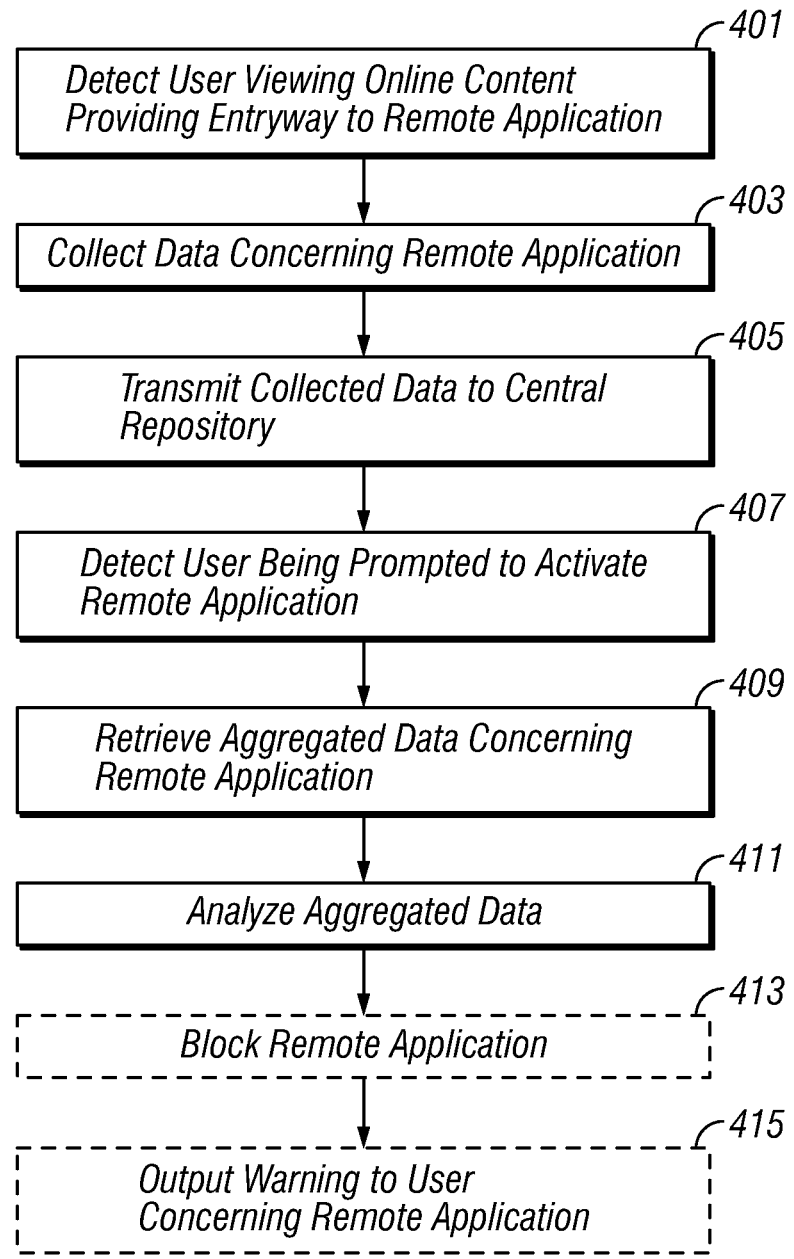
FIG. 4 is a flowchart of the operation of a remote application protection system, according to some embodiments.

FIG. 4 is a flowchart of the operation of a remote application protection system 101 (FIG. 1), according to some embodiments. The remote application detecting module 321 (FIG. 3) of the remote application protection system 101 (FIG. 1) detects 401 whenever the user 303 (FIG. 3) of the local computer system 210 (FIG. 2) views online content 311 (FIG. 3) that provides an entryway to a remote application 301 (FIG. 3). When such a detection occurs, the data collecting module 305 (FIG. 3) of the remote application protection system 101 (FIG. 1) collects 403 data 307 (FIG. 3) concerning the remote application 301 (FIG. 3), as well as the user's interaction with the online content 311 (FIG. 3) and/or the remote application 301 (FIG. 3) itself. The transmitting module 313 (FIG. 3) of the remote application protection system 101 (FIG. 1) transmits 405 the collected data 307 to the central repository 102 (FIG. 1) for aggregation with collected data 307 (FIG. 3) from other sources.

The remote application detecting module 321 (FIG. 3) detects 407 when the user 303 (FIG. 3) of the local computer system 210 (FIG. 2) is being prompted to activate a new remote application 301 (FIG. 3). The transmitting module 313 (FIG. 3) retrieves 409 aggregated data 317 (FIG. 3) concerning the new remote application 301 (FIG. 3) from the central repository 120 (FIG. 1). The aggregated data analyzing module 323 (FIG. 3) of the remote application protection system 101 (FIG. 1) analyzes 411 the received aggregated data 317 (FIG. 3) to determine whether the new remote application 301 (FIG. 3) is benign. Responsive to determining that the new remote application 301 (FIG. 3) is not benign, the blocking module 327 (FIG. 3) of the remote application protection system 101 (FIG. 1) can block 413 the activation of the remote application 301 (FIG. 3), and/or the warning module 329 (FIG. 3) of the remote application protection system 101 (FIG. 1) can output 415 a warning to the user 303 (FIG. 3).

As will be understood by those familiar with the art, the invention may be embodied in other specific forms without departing from the spirit or essential characteristics thereof. Likewise, the particular naming and division of the portions, modules, agents, managers components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for protecting a local user from security threats posed by remote applications, the method comprising the steps of:

detecting, by at least one computer, that a user of a local computer system is viewing online content that provides an entryway to a remote application;

collecting, by the at least one computer, data concerning the remote application associated with the online content that provides the entryway to the remote application;

collecting, by the at least one computer, data concerning interaction by the user with the online content that provides the entryway to the remote application;

wherein said data concerning interaction by the user with the online content that provides the entryway to the remote application comprises one or more of:

one or both of when and under what circumstances a user activates the remote application;

at what point the user rejects the remote application;

the user removing the remote application; and a time interval between initial registration for the remote application and removal of the registered-for remote application;

wherein the remote application further comprises an application that is not installed on the user's local computer system but can be run remotely from the user's local computer system;

transmitting, by the at least one computer, the collected data to a central repository;

detecting, by the at least one computer, that the user of the local computer system is being prompted to activate a new remote application;

retrieving, by the at least one computer, aggregated data concerning the new remote application from the central repository;

analyzing, by the at least one computer, the retrieved aggregated data concerning the new remote application; and responsive to analyzing the retrieved aggregated data concerning the new remote application, determining, by the at least one computer, whether the new remote application is benign.

2. The method of claim 1 wherein:

the steps of 1) detecting, by the at least one computer, that the user of the local computer system is viewing online content that provides an entryway to a remote application and 2) detecting, by the at least one computer, that the user of the local computer system is being prompted to activate a new remote application further comprise monitoring the network traffic of the user of the local computer system.

3. The method of claim 1 further comprising:

maintaining, by the at least one computer, a database of descriptions of online content providing entryways to remote applications; and utilizing, by the at least one computer, stored descriptions of online content providing entryways to remote applications to perform the steps of: 1) detecting, by the at least one computer, that the user of the local computer system is viewing online content that provides an entryway to a remote application and 2) detecting, by the at least one computer, that the user of the local computer system is being prompted to activate a new remote application.

4. The method of claim 3 further comprising:

further utilizing, by the at least one computer, stored descriptions of online content providing entryways to remote applications to perform the steps of: 1) collecting, by the at least one computer, data concerning the remote application associated with the online content that provides the entryway to the remote application and 2) collecting, by the at least one computer, data concerning interaction by the user with the online content that provides the entryway to the remote application.

5. The method of claim 1 further comprising:

collecting, by the at least one computer, data concerning interaction by the user with the remote application.

6. The method of claim 1 further comprising:

responsive to analyzing the retrieved aggregated data concerning the new remote application, determining, by the at least one computer, that the new remote application is not benign; and responsive to determining that the new remote application is not benign, blocking, by the at least one computer, the new remote application.

7. The method of claim 1 further comprising:

responsive to analyzing the retrieved aggregated data concerning the new remote application, determining, by the at least one computer, that the new remote application is not benign; and responsive to determining that the new remote application is not benign, outputting by the at least one computer, a warning to the user of the local computer system concerning the new remote application.

8. The method of claim 1 wherein analyzing, by the at least one computer, the retrieved aggregated data concerning the new remote application further comprises:

responsive to individual pieces of aggregated data concerning the new remote application, adjusting, by the at least one computer, a reputational score of the new remote application.

9. The method of claim 8 further comprising:

responsive to the reputational score of the new remote application reaching a given threshold, determining, by the at least one computer, that the new remote application is not benign.

10. The method of claim 1 further comprising:

a central repository on a server computer receiving data concerning at least a plurality of remote applications from a plurality of client computers;

aggregating, by the central repository on the server computer, the received data concerning at least the plurality of remote applications; and providing, by the central repository on the server computer, aggregated data concerning specific remote applications to specific client computers.

11. The method of claim 1 further comprising:

the central repository on the server computer receiving data concerning at least a plurality of remote applications from at least one third party.

12. At least one non-transitory computer readable storage medium for protecting a local user from security threats posed by remote applications, the at least one non-transitory computer readable-storage medium storing computer executable instructions that, when loaded into computer memory and executed by at least one processor of a computing device, cause the computing device to perform the following steps:

detecting that a user of a local computer system is viewing online content that provides an entryway to a remote application;

collecting data concerning the remote application associated with the online content that provides the entryway to the remote application;

collecting data concerning interaction by the user with the online content that provides the entryway to the remote application;

wherein said data concerning interaction by the user with the online content that provides the entryway to the remote application comprises one or more of:

one or both of when and under what circumstances a user activates the remote application;

at what point the user rejects them remote application;

the user removing the remote application; and a time interval between initial registration for the remote application and removal of the registered-for remote application;

wherein the remote application further comprises an application that is not installed on the user's local computer system but can be run remotely from the user's local computer system;

transmitting the collected data to a central repository;

detecting that the user of the local computer system is being prompted to activate a new remote application;

retrieving aggregated data concerning the new remote application from the central repository;

analyzing the retrieved aggregated data concerning the new remote application; and responsive to analyzing the retrieved aggregated data concerning the new remote application, determining whether the new remote application is benign.

13. The at least one non-transitory computer readable-storage medium of claim 12 wherein:
performing the steps of 1) detecting that the user of the local computer system is viewing online content that provides an entryway to a remote application and 2) detecting that the user of the local computer system is being prompted to activate a new remote application further comprise monitoring the network traffic of the user of the local computer system.

14. The at least one non-transitory computer readable-storage medium of claim 12 further storing computer executable instructions to perform the following additional steps:
maintaining a database of descriptions of online content providing entryways to remote applications; and
utilizing stored descriptions of online content providing entryways to remote applications to perform the steps of: 1) detecting that the user of the local computer system is viewing online content that provides an entryway to a remote application and 2) detecting that the user of the local computer system is being prompted to activate a new remote application.

15. The at least one non-transitory computer readable-storage medium of claim 14 further storing computer executable instructions to perform the following additional step:
further utilizing stored descriptions of online content providing entryways to remote applications to perform the steps of: 1) collecting data concerning the remote application associated with the online content that provides the entryway to the remote application and 2) collecting data concerning interaction by the user with the online content that provides the entryway to the remote application.

16. The at least one non-transitory computer readable-storage medium of claim 12 further storing computer executable instructions to perform the following additional steps:
responsive to analyzing the retrieved aggregated data concerning the new remote application, determining that the new remote application is not benign; and
responsive to determining that the new remote application is not benign, blocking the new remote application.

17. The at least one non-transitory computer readable-storage medium of claim 12 further storing computer executable instructions to perform the following additional steps:
responsive to analyzing the retrieved aggregated data concerning the new remote application, determining that the new remote application is not benign; and
responsive to determining that the new remote application is not benign, outputting a warning to the user of the local computer system concerning the new remote application.

18. The at least one non-transitory computer readable-storage medium 12 wherein analyzing the retrieved aggregated data concerning the new remote application further comprises:
responsive to individual pieces of aggregated data concerning the new remote application, adjusting a reputational score of the new remote application; the at least one non-transitory computer readable-storage medium further storing computer executable instructions to perform the following additional step:
responsive to the reputational score of the new remote application reaching a given threshold, determining that the new remote application is not benign.

19. The at least one non-transitory computer readable-storage medium of claim 12 further storing computer executable instructions to perform the following additional steps:
a central repository on a server computer receiving data concerning at least a plurality of remote applications from a plurality of client computers;
aggregating, by the central repository on the server computer, the received data concerning at least the plurality of remote applications; and
providing, by the central repository on the server computer, aggregated data concerning specific remote applications to specific client computers.

20. A computer system for protecting a local user from security threats posed by remote applications, the computer system comprising:
at least one processor;
system memory;
a central repository configured for receiving data concerning at least a plurality of remote applications from a plurality of client computers and for aggregating the received data;
a detecting module configured for detecting that a user of a local computer system is being prompted to activate a remote application;
a collecting module configured for collecting data concerning interaction by the user with the online content that provides the entryway to the remote application;
wherein said data concerning interaction by the user with the online content that provides the entryway to the remote application comprises one or more of:
one or both of when and under what circumstances a user activates the remote application;
at what point remote application;
the user removing the remote application; and
a time interval between initial registration for the remote application and removal of the registered-for remote application;
wherein the remote application further comprises an application that is not installed on the user's local computer system but can be run remotely from the user's local computer system;
a retrieving module configured for retrieving aggregated data concerning the remote application from the central repository;
an analyzing module configured for analyzing the retrieved aggregated data concerning the remote application; and
a determining module for determining whether the remote application is benign, responsive to analyzing the retrieved aggregated data concerning the remote application.

* * * * *